March 31, 1931.     E. S. COLE     1,798,589
FLOW RECORDING AND REGISTERING DEVICE
Filed March 6, 1924
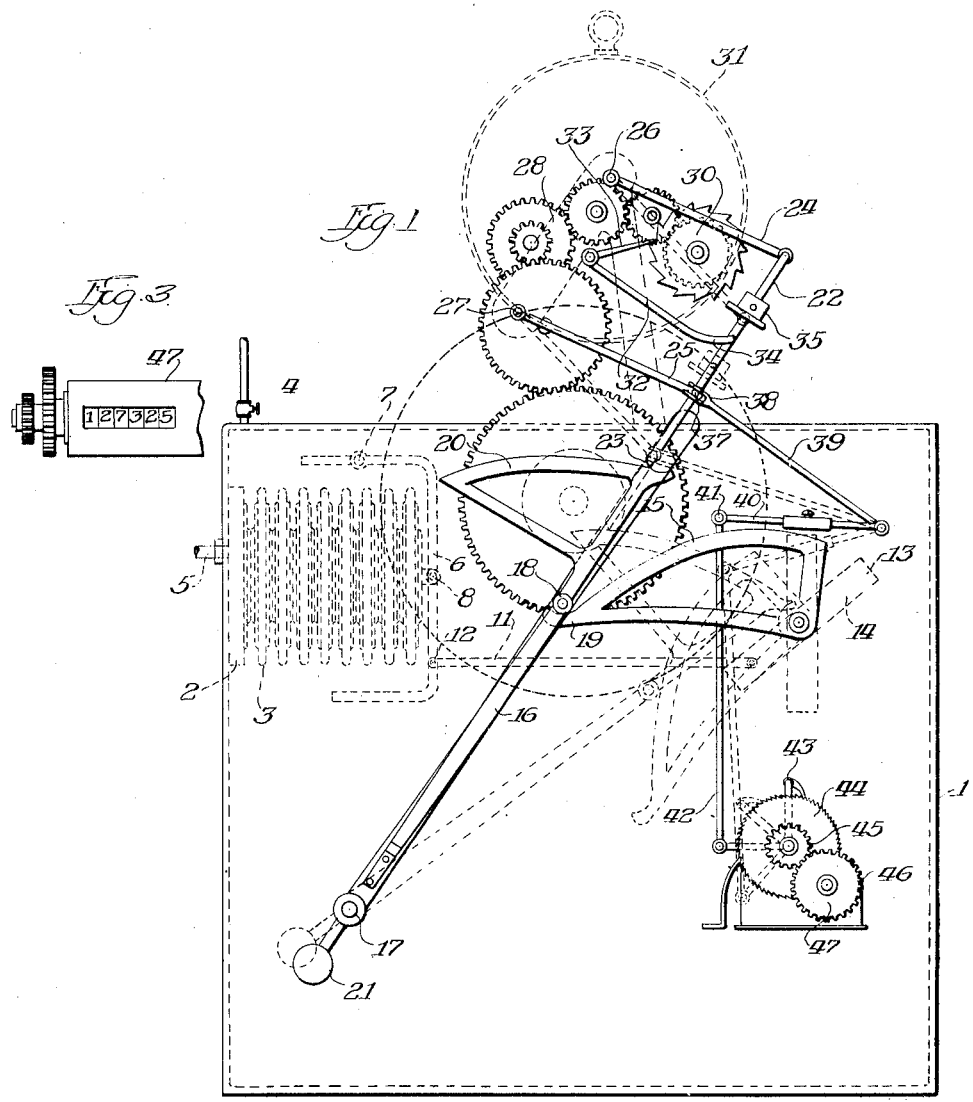
Inventor
Edward S. Cole.

Patented Mar. 31, 1931

1,798,589

UNITED STATES PATENT OFFICE

EDWARD S. COLE, OF NEW YORK, N. Y.

FLOW RECORDING AND REGISTERING DEVICE

Application filed March 6, 1924. Serial No. 697,233.

My invention relates to devices or apparatus for recording and measuring the flow of moving streams, particularly for recording the rate of flow in a unit of time and for registering the total volume which flows in a definite measured time.

One of the objects of the invention is to provide a simple, practical and inexpensive device or apparatus of the class specified.

Another object of the invention is to secure accuracy both in recording and registering.

Another object of the invention is to prevent operation of the mechanism of the device or apparatus from interfering with the delicate and sensitive action of the apparatus in connection with the flowing stream, so that there shall be no inaccuracy by reason of interference with the flowing stream mechanism by the recording and registering associated mechanisms.

In the accompanying drawing Fig. 1 is a side elevation of a flow recording and registering device embodying my present invention;

Fig. 2 is a plan view of a part of the mechanism; and

Fig. 3 is an elevation of a detail of construction.

Referring to the drawings, I show a device or apparatus having a metallic case 1, in which is arranged a device to be actuated or controlled by a flowing stream, such as a stream of water in a straight pipe or main, the rate of flow of which and the total amount flowing in a given time are desired to be known and recorded or registered. The device shown to be thus controlled or actuated by the flowing stream is a diaphragm arrangement 2 consisting of a plurality of connected diaphragms 3 capable of having a bellows-like action so as to be horizontally extensible and contractable. Two pipes 4 and 5 run to case 1 and to this diaphragm arrangement 2 respectively, and convey to the interior thereof the static and velocity pressure, respectively, of the flowing stream to be measured, it being understood that pipes 4 and 5 are extended to a conduit in which the flowing stream is passing and their ends are provided with up and down stream orifices to gain that velocity and static pressure. The diaphragms 3 act upon a movable mechanism, as for example, a pivoted lever 6 pivoted to the instrument case at 7 and to the diaphragm arrangement at 8. The lever 6 actuates a link 11 pivoted to 6 at 12, and link 11 is connected to a magnet 13 inside of the case 1. Magnet 13 cooperates with another magnet 14 on the outside of the case 1. Thus the diaphragm arrangement 2 is controlled by the difference in static and velocity pressures of the flowing stream and will impart motion to the interior magnet 13 which will in turn impart motion to the exterior magnet 14.

This general arrangement is illustrated, described and claimed in my Patent No. 1,185,609, issued May 30, 1916, for flow meter and recorder.

The exterior magnet 14 cooperates with mechanism for defining the extent of movement of the magnets 13 and 14, so that the movement of the outer magnet 14 may be taken advantage of for recording and registering purposes. While this mechanism could take various forms, I show herein one especially advantageous mechanism comprising a cam 15 secured to magnet 14 and arranged to swing about the pivotal axis of the same, whereby magnet 14 will be swung vertically as indicated in dotted lines in Fig. 1. Swinging magnet cam 15 cooperates with a swinging arm 16 pivoted at 17 and having a roller 18 cooperating with the curved or recessed end 19 of cam 15. Thus as cam 15 swings up and down arm 16 will also swing up and down by reason of its weight, the down position being shown in dotted lines in Fig. 1. Arm 16 is provided with a cam 20 at its upper end and at its lower end with a counterweight 21 by which it is very closely balanced, but enough weight is allowed in its upper end to insure its swinging down when cam 15 is swung down, the counterbalancing being sufficient however, to insure arm 16 being swung up by the upwardly swinging movement of cam 15.

A link or rod 22 cooperates with cam 20 and is provided with a point 23 which contacts with cam 20, link 22 being longitudinally movable, and to insure a longitudinal movement as nearly straight as possible, said link is carried by and pivoted to swinging arms or links 24 and 25, which latter are pivoted at 26 and 27, respectively on a frame bar 28 indicated in dotted lines in Fig. 1. Thus as the cam 20 swings up and down, the link 22 moves longitudinally up and down, the contact point 23 following the cam surface, and this movement of link 22 has a substantially straight longitudinal movement.

The link 22 is actuated positively by power means so as to move it positively away from cam 20 and also permit it to drop to contact with cam 20, whereby said link 22 is given a reciprocating motion, away from cam 20 by power and back to cam 20 by gravity, and it will be seen that the extent of movement of link 22 will vary according as the position of cam 20 varies, being least when cam 20 is in its uppermost position, as shown in full lines in Fig. 1, and being most when cam 20 is in its downmost position, as indicated in dotted lines in said Fig. 1.

The power means by which link 22 is thus reciprocated is preferably a star or toothed wheel 30 of a clock 31, together with a bell crank 32 having one arm 33 adapted to contact with and be actuated by the teeth of wheel 30 and having another arm 34 adapted to contact and cooperate with a collar 35 on link or rod 22. Thus rotation of wheel 30 will constantly cause an intermittent lifting of bell crank arm 33 and this in turn will cause the intermittent lifting of rod 22, the downward movement of which will be permitted by the slipping of the teeth of wheel 30 one after another from under the end of bell crank arm 33.

This intermittent reciprocating motion of link 22, the extent of which varies in accordance with position of cam 20, is utilized to actuate registering mechanism for registering the total volume flowing in the pipe or conduit. In the arrangement shown link 22 is provided with a pin 37 engaging a fork 38 on a pivoted arm 39 forming one side of a bell crank, the other side 40 of which is pivoted at 41 to a link 42 extending downwardly and arranged to actuate a pawl 43, the pawl 43 driving a wheel 44 having a gear 45 meshing with gear 46 of a total register device 47. Thus the intermittent up and down movement of link 22 will cause the actuation of register 47 and each intermittent actuation will depend on the extent of movement of link 22 which will in turn depend on the position of cam 20, so that the variations in position of cam 20 will cause variations in extent of movement on the part of the total register mechanism and consequently the actuations of the latter will be in proportion to the flow of current in the flowing stream and by proper calibration and arrangement the registrations will sum up the total amount which flows through the conduit, the same being preferably registered in gallons indicated by the register 47.

Arrangement is also preferably made for recording the rate or quantity of flow for a given unit of time, as for example, a second, and this is secured by having a marking device such as a pen 48 mounted on axis 17 carrying swinging arm 16, and by having a chart whereby the movements of arm 16 as caused by magnet cam 15, will cause pen 48 to make a continuous varying line on chart 49, which chart may be divided so that the pen marking will indicate rate or quantity of flow, as for example number of gallons flowing per second.

Thus the device will both record by pen or pencil on a rotary chart, the amount of flow per unit of time, and will also make a total registration of the entire or total volume of flow, and it will be noted that this recording and registration are preferably secured by the same flow operated mechanism, and further that the registering device is operated positively by power mechanism, the extent of operation only being determined by the flow responsive mechanism, so that power to operate the registering device is not taken from the flowing stream or the flow responsive mechanism, and consequently danger or liability of inaccuracy or interference of the proper working of the instrument by taking power in that way is avoided.

It will be understood that changes and modifications may be made without departing from the spirit of the invention.

What I claim is:

1. A device of the class specified comprising a pressure sensitive device having a swinging cam and also having a motion limiting device controlled by said cam, power mechanism controlled by said motion limiting device and registering mechanism actuated by said power mechanism.

2. A device of the class specified comprising a pressure sensitive device having a swinging cam and also having a motion limiting device controlled by said cam, power mechanism whose extent of operation is determined by said motion limiting device and registering mechanism actuated by said power mechanism.

3. A device of the class specified comprising a pressure sensitive device having a swinging cam, a swinging arm whose position is controlled by the position of said swinging cam, said arm being also provided with a cam, a longitudinally movable member arranged to come in contact with said second mentioned cam and to have its longitudinal position controlled by the same, swinging links carrying said longitudinally movable member, power means for actuating said member away from said second mentioned cam, said member being arranged to drop to contact with said cam by gravity, and registering mechanism controlled by the movements of said longitudinally movable member away from said cam.

4. An apparatus of the class specified comprising a pressure responsive means including a swinging cam, a swinging arm controlled by said cam and also carrying a cam, a longitudinally movable member contacting with said second mentioned cam, swinging links carrying said longitudinally movable member, a bell crank arranged to actuate said member away from the cam and permit it to drop to the cam by gravity and a clock mechanism actuating said bell crank and registering mechanism actuated by said longitudinally movable member.

5. An apparatus of the class specified comprising a pressure responsive means including a swinging cam, a swinging arm controlled by said cam and also carrying a cam, a longitudinally movable member contacting with said second mentioned cam, swinging links carrying said longitudinally movable member, a bell crank arranged to actuate said member away from the cam and permit it to drop to the cam by gravity and a clock mechanism actuating said bell crank and registering mechanism actuated by said longitudinally movable member, said mechanism comprising a bell crank actuated by said member and having sliding connection therewith and a registering device having a link connection with said bell crank.

6. An apparatus of the class specified, comprising a collapsible and extensible bellows arrangement, arranged in a casing so that the bellows will be varied in size by variations in the water pressure, a magnet connected with an arm connected to said bellows, another magnet carrying a cam controlled by the first magnet, a swinging arm having a roller adapted to travel on the cam surface of said cam, said swinging arm being provided with a cam surface, a reciprocable member and power mechanism for actuating the same, said member being adapted to fall by gravity to said cam surface and being reciprocated therefrom by said power mechanism, a register, and power transmitting connections between said register and said reciprocating member for operating the register.

7. The combination with a registering mechanism and reciprocating means for operating said mechanism, of a swinging cam and a motion limiting device controlled by the cam and arranged to limit the motion of said reciprocating means.

8. The combination with a registering device, of a swinging cam, a reciprocating member connected for actuating the register, means for actuating said reciprocating member in one direction, and means for controlling the extent of its return movement.

9. The combination with a registering device, of a swinging cam, a reciprocating member connected for actuating the register, means for actuating said reciprocating member in one direction, and means for controlling the extent of its return movement, said last mentioned means comprising a swinging arm carrying a cam and controlled by the first mentioned cam.

10. The combination of a swinging cam, a register, reciprocating means for actuating the register, a power device for actuating the reciprocating means in one direction, and a device controlled by said cam for limiting the extent of return movement of said reciprocating means.

11. The combination of a registering device, and means for operating the same comprising a swinging arm carrying a cam and a reciprocating member arranged for actuation in one direction and controlled as to its return movement by said cam.

12. An apparatus of the class specified having a pressure-responsive element, devices operated thereby which include a swinging cam, an arm controlled by said cam and also carrying a cam, a longitudinally movable member contacting with the said second mentioned cam, swinging links carrying said longitudinally movable member, a fulcrumed lever arranged to actuate said member away from the second mentioned cam and permitting it to drop to the said second mentioned cam by gravity, a clock mechanism actuating said fulcrumed lever and registering mechanism actuated by said longitudinally movable member, said mechanism comprising a fulcrumed lever actuated by said member and having sliding connection therewith, and a registering device with a link connected thereto, said link being operatively connected with said fulcrumed lever.

In witness whereof, I hereunto subscribe my name this 21st day of February, A. D. 1924.

EDWARD S. COLE.